(12) United States Patent
Le et al.

(10) Patent No.: US 10,944,914 B1
(45) Date of Patent: Mar. 9, 2021

(54) SYSTEM AND METHOD FOR GENERATING MULTI-EXPOSURE FRAMES FROM SINGLE INPUT

(71) Applicant: Samsung Electronics Co., Ltd., Suwon-si (KR)

(72) Inventors: Long N. Le, Richardson, TX (US); Hamid R. Sheikh, Allen, TX (US); Zeeshan Nadir, Richardson, TX (US); John W. Glotzbach, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/700,763

(22) Filed: Dec. 2, 2019

(51) Int. Cl.
*H04N 5/235* (2006.01)
*H04N 5/355* (2011.01)
*H04N 5/359* (2011.01)
*H04N 5/232* (2006.01)

(52) U.S. Cl.
CPC ......... *H04N 5/2356* (2013.01); *H04N 5/2355* (2013.01); *H04N 5/23267* (2013.01); *H04N 5/359* (2013.01); *H04N 5/35536* (2013.01)

(58) Field of Classification Search
CPC ............. H04N 5/2356; H04N 5/23267; H04N 5/2355; H04N 5/35536; H04N 5/359; G06T 5/50; G06T 5/003; G06T 2207/20081; G06T 2207/20084; G06T 2207/20221; G06T 2207/10144; G06T 2207/20208; G06T 2207/20012; G06N 3/08
USPC ....................................................... 348/239
See application file for complete search history.

(56) References Cited

U.S. PATENT DOCUMENTS

| 7,548,689 | B2* | 6/2009 | Yap | G03B 7/08 396/234 |
| 9,040,892 | B2* | 5/2015 | Smith | H04N 5/2352 250/208.1 |
| 9,131,172 | B2* | 9/2015 | Tsuzuki | H04N 5/23254 |
| 10,530,991 | B2* | 1/2020 | Wang | G06N 3/08 |
| 10,664,722 | B1* | 5/2020 | Sharma | G06Q 30/0641 |
| 10,708,525 | B2* | 7/2020 | Pourreza Shahri | H04N 5/35581 |
| 10,742,892 | B1* | 8/2020 | Le | G06T 5/009 |
| 10,750,098 | B2* | 8/2020 | Fujinami | H04N 5/35554 |
| 2008/0158398 | A1* | 7/2008 | Yaffe | H04N 3/155 348/294 |
| 2018/0220061 | A1* | 8/2018 | Wang | H04N 5/23216 |
| 2018/0241929 | A1* | 8/2018 | Bouzaraa | H04N 5/23277 |
| 2018/0293710 | A1* | 10/2018 | Meyer | G06T 5/002 |

(Continued)

OTHER PUBLICATIONS

Chen et al., "Learning to See in the Dark," CVPR, 2018, 10 pages.

(Continued)

*Primary Examiner* — Pritham D Prabhakher

(57) ABSTRACT

A method includes obtaining, using at least one image sensor of an electronic device, a first image frame of a scene. The method also includes using a convolutional neural network to generate, from the first image frame, multiple second image frames simulated to have different exposures. One or more objects in the scene in each second image frame are aligned with one or more corresponding objects in the scene in at least one other second image frame and are aligned with one or more corresponding objects in the scene in the first image frame. The method further includes blending the multiple second image frames to generate a final image of the scene.

20 Claims, 16 Drawing Sheets

(56) References Cited

U.S. PATENT DOCUMENTS

2019/0306399 A1* 10/2019 Fujinami ............ H04N 5/35581
2020/0068151 A1* 2/2020 Pourreza Shahri ..... G06T 5/002
2020/0265567 A1* 8/2020 Hu ......................... G06T 5/003

OTHER PUBLICATIONS

Eilertsen et al., "HDR image reconstruction from a single exposure using deep CNNs," ACM Transactions on Graphics, vol. 36, No. 6, Article 178, Nov. 2017, 15 pages.

* cited by examiner

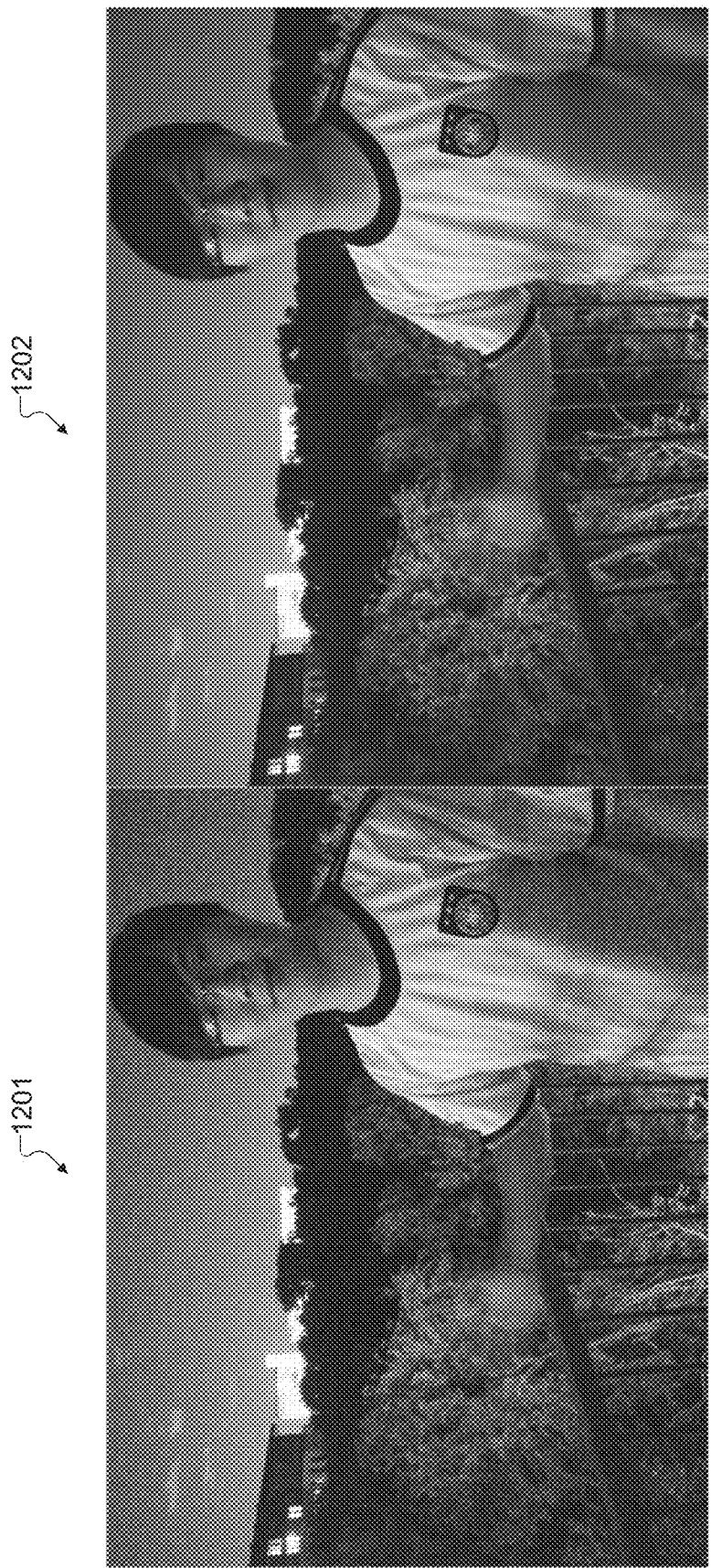

SYSTEM AND METHOD FOR GENERATING MULTI-EXPOSURE FRAMES FROM SINGLE INPUT

TECHNICAL FIELD

This disclosure relates generally to image capturing systems. More specifically, this disclosure relates to a system and method for generating multi-exposure frames from a single input.

BACKGROUND

Many mobile electronic devices, such as smartphones and tablet computers, include cameras that can be used to capture still and video images. While convenient, cameras on mobile electronic devices typically suffer from a number of shortcomings. For example, cameras on mobile electronic devices often capture images with under-exposed or over-exposed regions, such as when capturing images of natural scenes. This is typically because image sensors in the cameras have limited dynamic range. It is possible to capture multiple image frames of a scene and then combine the "best" parts of the image frames to produce a blended image. However, producing a blended image from a set of image frames with different exposures is a challenging process, especially for dynamic scenes. As another example, cameras on mobile electronic devices typically have poor performance in low-light situations. While it is possible to increase the amount of light collected at an image sensor by increasing the exposure time, this also increases the risk of producing blurred images due to object and camera motion.

SUMMARY

This disclosure provides a system and method for generating multi-exposure frames from a single input.

In a first embodiment, a method includes obtaining, using at least one image sensor of an electronic device, a first image frame of a scene. The method also includes using a convolutional neural network to generate, from the first image frame, multiple second image frames simulated to have different exposures. One or more objects in the scene in each second image frame are aligned with one or more corresponding objects in the scene in at least one other second image frame and are aligned with one or more corresponding objects in the scene in the first image frame. The method further includes blending the multiple second image frames to generate a final image of the scene.

In a second embodiment, an electronic device includes at least one image sensor and at least one processing device. The at least one processing device is configured to obtain a first image frame of a scene using the at least the one image sensor. The at least one processing device is also configured to use a convolutional neural network to generate, from the first image frame, multiple second image frames simulated to have different exposures. One or more objects in the scene in each second image frame are aligned with one or more corresponding objects in the scene in at least one other second image frame and are aligned with one or more corresponding objects in the scene in the first image frame. The at least one processing device is further configured to blend the multiple second image frames to generate a final image of the scene.

In a third embodiment, a non-transitory machine-readable medium contains instructions that when executed cause at least one processor of an electronic device to obtain a first image frame of a scene using at least one image sensor of the electronic device. The medium also contains instructions that when executed cause the at least one processor to use a convolutional neural network to generate, from the first image frame, multiple second image frames simulated to have different exposures. One or more objects in the scene in each second image frame are aligned with one or more corresponding objects in the scene in at least one other second image frame and are aligned with one or more corresponding objects in the scene in the first image frame. The medium further contains instructions that when executed cause the at least one processor to blend the multiple second image frames to generate a final image of the scene.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 11A, 11B, 12A, and 12B illustrate examples of benefits that can be realized using one or more of the embodiments of this disclosure.

DETAILED DESCRIPTION

Figure 1:
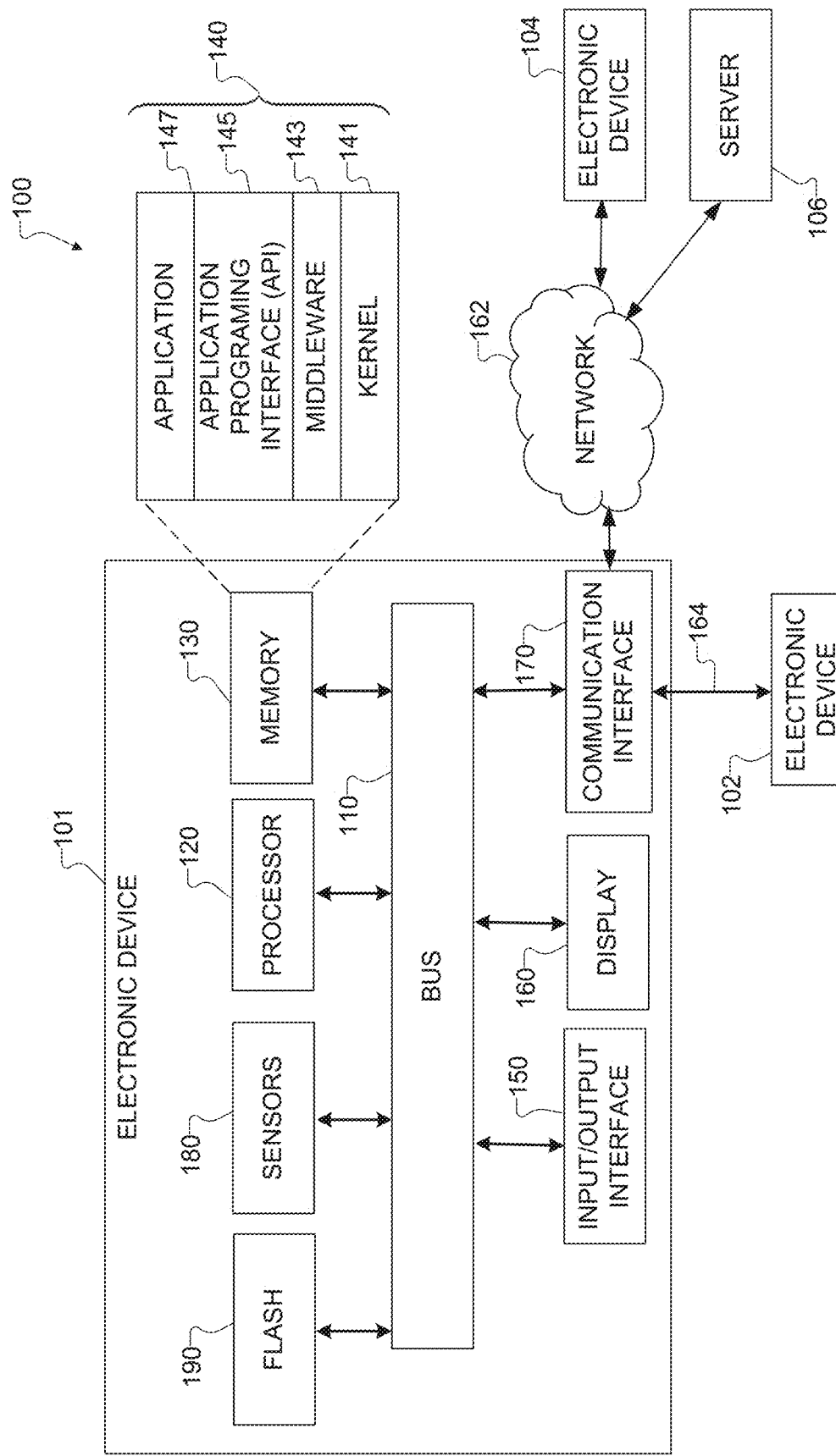
FIG. 1 illustrates an example network configuration including an electronic device in accordance with this disclosure.

FIGS. 1 through 13, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, many mobile electronic devices, such as smartphones and tablet computers, include cameras that can be used to capture still and video images, but these cameras suffer from a number of shortcomings. For example, these cameras often capture images with under-exposed or over-exposed regions, such as when capturing images of natural scenes. As another example, these cameras typically have poor performance in low-light situations, and increasing the exposure time also increases the risk of motion blur.

Many imaging applications require the use of multiple image frames captured at different exposure levels. Example types of imaging applications here can include applications supporting high dynamic range (HDR), relighting, and the like. Traditionally, multiple image frames captured at different exposure levels are captured sequentially and therefore at different times. As a consequence, one or more objects in a scene can move between image frames, such as due to motion of the object or to motion of the camera. This can result in difficulties in imaging applications, particularly where a perfect (or nearly perfect) alignment between image frames is preferred or required.

In many multi-frame applications, misalignment between image frames creates significant challenges for multi-frame processing and can result in various types of image artifacts being produced, such as blending ghosts, reduced blending, patchy noises, and the like. As a particular example, a blended image can contain one or more blurred portions in areas where motion is occurring. While some artifacts like ghosting can be hidden somewhat by excessively brightening surrounding areas, this can be undesirable, such as when the excessive brightening hides details of background objects and reduces the overall clarity of the image.

This disclosure provides various techniques for generating multi-exposure image frames from a single input. As described in more detail below, embodiments of this disclosure provide a neural network-based architecture that generates multiple image frames at different exposure levels based on a single captured image frame. The disclosed neural network-based architecture (also referred to below as a single-input multi-exposure or "SIME" network) can efficiently generate multi-exposure image frames based on a single input image frame. The generated multi-exposure image frames are aligned in multiple image domains, such as the Bayer ("raw format") domain and the YUV ("visual format") domain. The multi-exposure image frames may then be blended or otherwise processed to produce one or more images of a scene with improved image quality, such as fewer or no under-exposed/over-exposed regions and little or no motion blur. These techniques provide visually better image frames compared to conventional image signal processor-based approaches, such as those that apply a gain and noise filtering to a captured image frame.

Note that while the techniques described below are often described as being performed using a mobile electronic device, other electronic devices could also be used to perform or support these techniques. Thus, these techniques could be used in various types of electronic devices. Also, while the techniques described below are often described as processing image frames when capturing still images of a scene, the same or similar approaches could be used to support the capture of video images.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). For example, the processor 120 can receive image data captured by at least one camera during a capture event. Among other things, the processor 120 can process the image data (as discussed in more detail below) using a convolutional neural network to generate multiple aligned image frames.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 includes one or more applications for image capture and image processing as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 include one or more cameras or other image sensors for capturing images of a scene. The sensor(s) 180 may also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101. The one or more cameras or other image sensors can optionally be used in conjunction with at least one flash 190. The flash 190 represents a device configured to generate illumination for use in image capture by the electronic device 101, such as one or more LEDs.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can optionally support the electronic device 101 by performing or supporting at least one of the operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
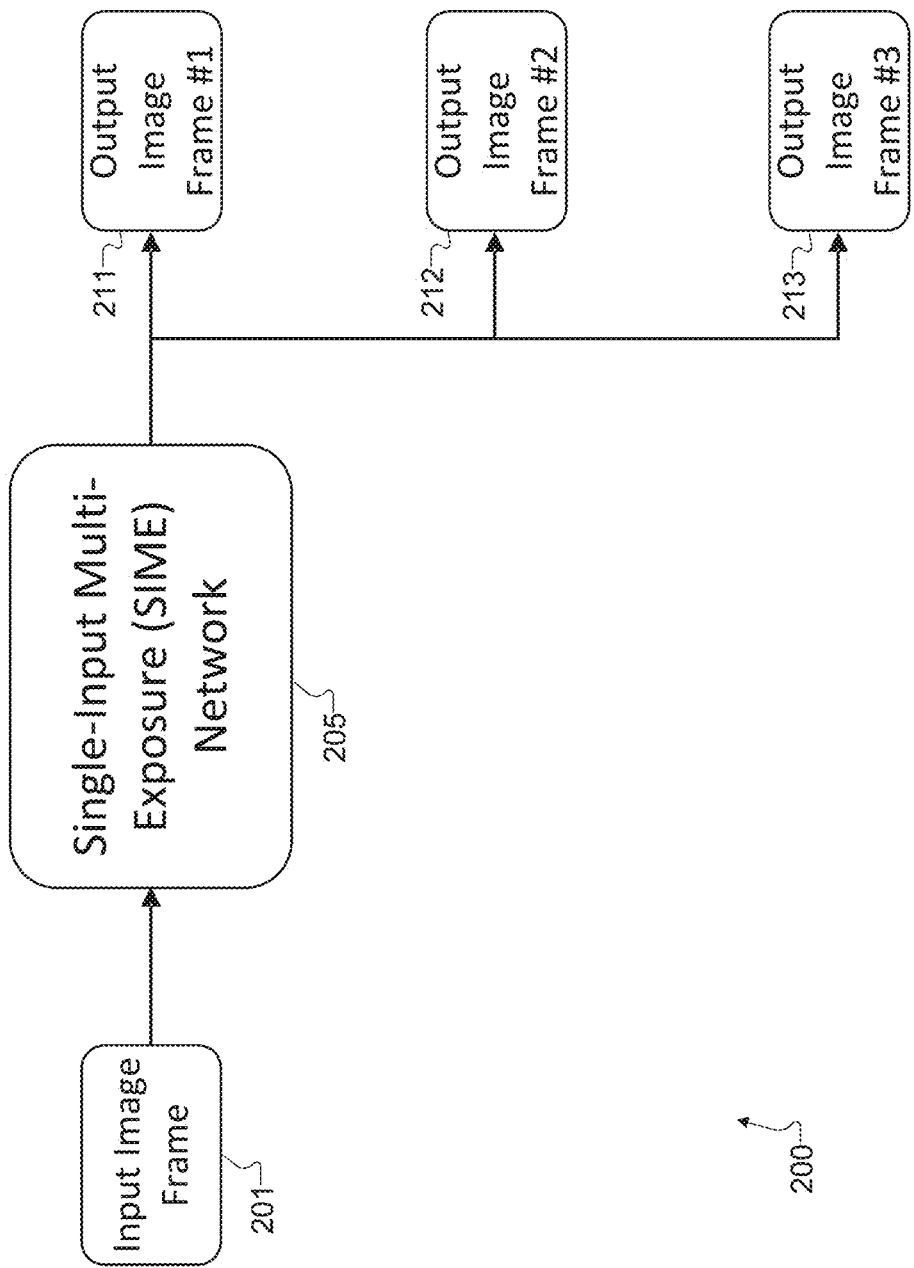
FIG. 2 illustrates an example process for generating multiple image frames using a single-input multi-exposure (SIME) network in accordance with this disclosure.

FIG. 2 illustrates an example process 200 for generating multiple image frames using a SIME network in accordance with this disclosure. For ease of explanation, the process 200 shown in FIG. 2 is described as involving the use of the electronic device 101 of FIG. 1. However, the process 200 shown in FIG. 2 could be used with any other suitable electronic device and in any suitable system.

As shown in FIG. 2, the electronic device 101 receives or obtains a single input image frame 201 of a scene captured using at least one camera or other image sensor of the electronic device 101. In some embodiments, the input image frame 201 of the scene is captured using a short exposure time, at least relative to an automatically-determined exposure time (which is often referred to as a EV-0 exposure time). Because the exposure time is short, the input image frame 201 would tend to be dark, and not much detail would be clearly visible in the input image frame 201.

The input image frame 201 (also referred to as a "short frame") is provided as an input to a SIME network 205, which represents a convolutional neural network. The electronic device 101 executes or otherwise uses the SIME network 205 to generate multiple output image frames 211-213 using the single input image frame 201. Further details of the operations of the SIME network 205 are provided below. In this example, the SIME network 205 is used to generate three output image frames 211-213. However, the SIME network 205 may be used to generate two or more output image frames in other embodiments.

The output image frames 211-213 are generated to simulate images of the same scene captured at different exposure levels. In some embodiments, the first output image frame 211 may represent a short-exposure clean image frame (also referred to as a "short clean frame"). The output image frame 211 can be substantially similar to the input image frame 201, but much or all of the noise contained in the input image frame 201 can be removed by the SIME network 205 using a "de-noise" process. The second output image frame 212 may represent a normal-exposure image frame (also referred to as a "normal frame"). The output image frame 212 may be simulated to have been captured using an automatically-determined exposure time and may be generated by the SIME network 205 applying both a de-noise process and a brightening process to the input image frame 201. The third output image frame 213 may represent a long-exposure image frame (also referred to as a "long frame"). The output image frame 213 may be simulated to have been captured using an exposure time longer than the automatically-determined exposure time and may be generated by the SIME network 205 applying both a de-noise process and an even more brightening process to the input image frame 201. Note that as used here, the terms "short," "normal," and "long" are relative to each other and can represent any suitable exposure times such that "normal" is longer than "short" and "long" is longer than "normal." In many cases, "normal" refers to the automatically-determined exposure time that results in an image having a minimum of under-exposed or and/over-exposed regions.

Because multiple output image frames 211-213 are generated from a single input image frame 201, the output image frames 211-213 can exhibit much better inter-frame alignment than conventional multi-frame approaches. To a viewer, the output frames 211-213 appear to have perfect (or nearly perfect) alignment without any blurring or movement. In addition, use of the SIME network 205 is more computationally efficient than executing multiple single-input single-exposure (SISE) networks, which can be slower or require greater processing power to operate.

Although FIG. 2 illustrates one example of a process 200 for generating multiple image frames using a SIME network, various changes may be made to FIG. 2. For example, while the process 200 is shown as generating three output image frames, other embodiments could result in greater or fewer than three output image frames. Also, the operations of the SIME network 205 can be performed by any suitable component(s) of an electronic device 101 or other device, including the processor 120 of the electronic device 101 or by an image sensor 180 of the electronic device 101. In some cases, the SIME network 205 can be embedded in the image sensor itself.

Figure 3:
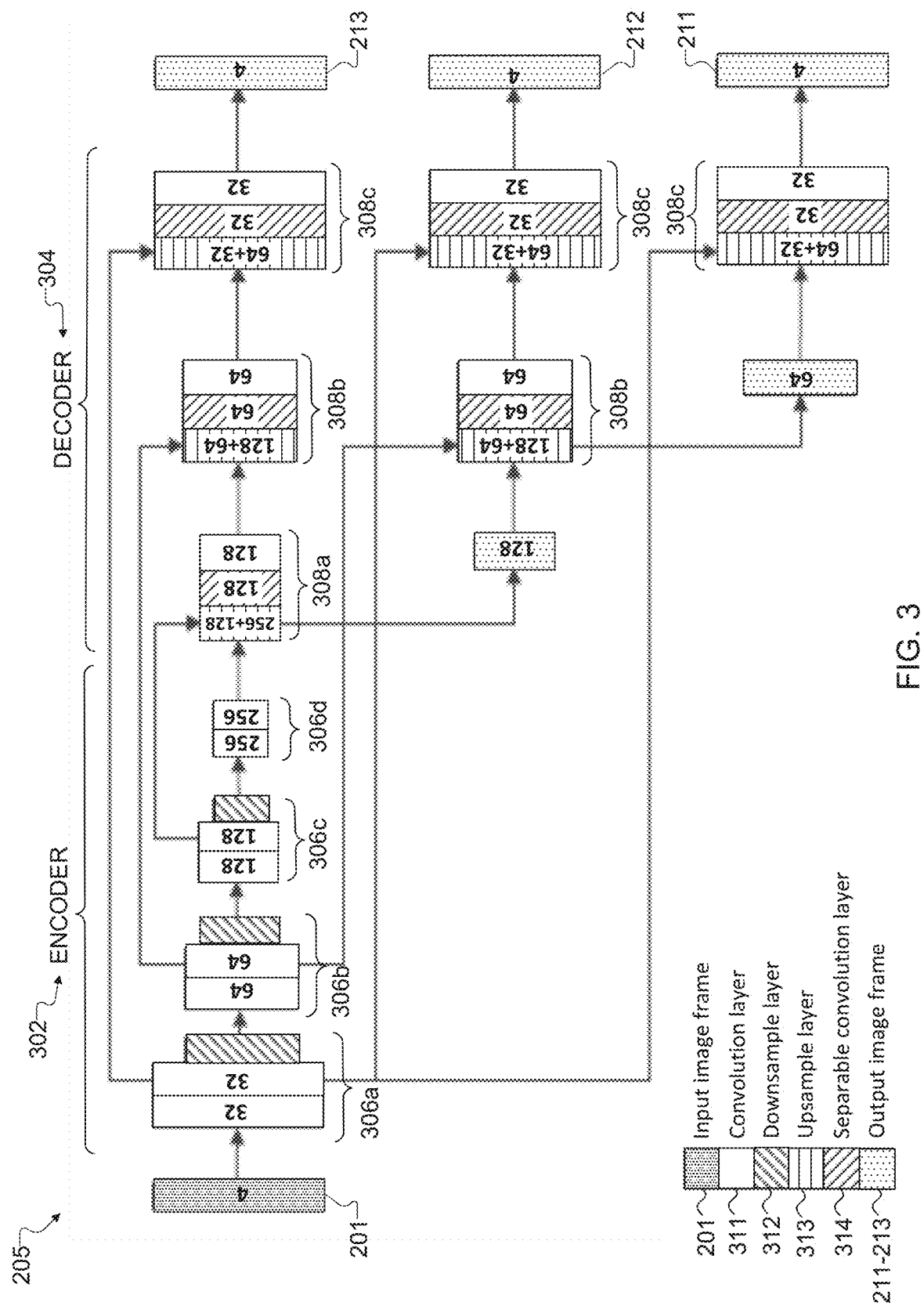
FIG. 3 illustrates additional details of the SIME network of FIG. 2 in accordance with this disclosure.

FIG. 3 illustrates additional details of the SIME network 205 of FIG. 2 in accordance with this disclosure. As shown in FIG. 3, the SIME network 205 again generally operates to receive the input image frame 201 and produce the multiple output image frames 211-213. To achieve this result, the SIME network 205 is based on a convolutional neural network architecture. A convolutional neural network architecture generally represents a type of deep artificial neural network, which is often applied to analyze images. In this example, the SIME network 205 includes an encoder path 302 and multiple decoder paths 304.

In this example, the numbers contained in some of the components in FIG. 3 (such as 2, 4, 32, 64, 128, etc.) represents the number of channels, features, or components that represent the input image frame 201. The encoding process generally increases the number of components that represent the input image frame 201, meaning the input image frame 201 is downsampled and the components that represent the input image frame 201 become more numerous (but each component becomes spatially smaller). The decoding process generally decreases the number of components that represent the output image frames 211-213, meaning the output of the encoding process is upsampled and the components that represent the output image frames 211-213 become less numerous (but each component becomes spatially larger). Concatenation of information is indicated in FIG. 3 using a "+" symbol (such as 256+128, 64+32, etc.). It should be noted here that while specific numerical values are shown in FIG. 3, these values are for illustration only.

The encoder path 302 is composed of multiple encoding stages 306a-306d. Each of the encoding stages 306a-306c includes two convolutional layers 311 and a downsampling layer 312, and the encoding stage 306d includes two convolutional layers 311 but no downsampling layer. In some embodiments, the two convolutional layers 311 can be generalized to a residual subnet, which can include a skip connection over the two convolutional layers 311 followed by an addition operation. Each of the convolutional layers 311 represents a layer of convolutional neurons, which operate to apply a convolution operation that emulates the response of individual neurons to visual stimuli. Each neuron typically applies some function to its input values (often by weighting different input values differently) to generate output values. Each of the downsampling layers 312 represents a layer that combines the output values of neuron clusters from one layer into input values for the next layer. The encoder path 302 here is shown as including four encoding stages 306a-306d with a total of eight convolutional layers 311 and three downsampling layers 312. However, the encoder path 302 could include different numbers of encoding stages, convolutional layers, and downsampling layers.

In some embodiments, each of the convolutional layers 311 can perform convolution with a filter bank (containing filters or kernels) to produce a set of feature maps. These feature maps can be batch-normalized, and an element-wise rectified linear unit (ReLU) function can be applied to the normalized feature map values. The ReLU function typically operates to ensure that none of the output values of a layer is negative, such as by selecting (for each normalized feature map value) the greater of that value or zero. Following that, in some embodiments, each of the downsampling layers 312 can perform max-pooling, such as with a window and a stride of two (non-overlapping window), and the resulting output can be sub-sampled, such as by a factor of two. Max-pooling can be used to achieve translation invariance over small spatial shifts in the input image frame 201, and sub-sampling can result in a large input image context (spatial window) for each pixel in the feature maps.

The common encoder path 302 is followed by multiple distinct decoder paths 304 for the multiple output image frames 211-213. Each of the decoder paths 304 is formed using one or more decoder stages 308a-308c, where the number of decoder stages 308a-308c in each decoder path 304 depends on the type of the output image frame 211-213 being generated by that decoder path 304. For example, the short clean output image frame 211 can be generated using one decoder stage 308c, the normal output image frame 212 can be generated using two decoder stages 308b-308c, and the long output image frame 213 can be generated using three decoder stages 308a-308c.

Each decoder stage 308a-308c includes an upsampling layer 313, which represents a layer that resizes its input. This can be accomplished by upscaling the feature maps received from a prior stage and concatenation with feature maps from the corresponding encoder stage. Concatenation is depicted in FIG. 3 by the arrows connecting an upsampling layer 313 with a previous stage and a corresponding encoder stage. Each decoder stage 308a-308c also includes a separable convolutional layer 314 that is used instead of a normal convolutional layer to efficiently reduce complexity in the most computationally demanding part in the SIME network 205 (as it compresses from a much higher depth). Each decoder stage 308a-308c further includes a normal convolutional layer 311 with moderate complexity since the previous layer has the same depth. Since fine details are removed in favor of high-level features along the encoding path, skip connections from encoding to decoding layers at the same scale can be used in FIG. 3 to bring back details into the various decoder paths 304.

In this example, each decoder stage 308a-308c is performed to avoid checkerboard artifacts commonly observed in conventional transposed convolutional layers. Namely, image resizing followed by convolutional layers is performed here in each decoder stage 308a-308c, instead of using transposed convolutions.

Depending on the implementation, various advantages can be achieved using the SIME network 205 based on the following principles and observations. In general, decoding paths operate on concatenation of previous layers, so decoding convolutional layers are generally computationally expensive. A better trade-off between computation and quality can be achieved by replacing standard convolutional layers with the separable convolutional layers 314. Also, the SIME network 205 is more efficient because the encoder path 302 is shared for the three output image frames 211-213, rather than requiring a separate encoder path 302 for each output image frame 211-213. Moreover, the decoder path 304 for the short clean output image frame 211 is smaller than the decoder path 304 for the long output image frame 213 because the smaller exposure gap (the change in brightness) requires less intensive computation.

In addition, since the exposure gap between the short input image frame 201 and the long output image frame 213 is large, a larger receptive field or deeper layers are used to optimize the trade-off between high-level noise suppression and signal-retention. As the exposure gap is reduced between the input and the output, the shorter exposure gap requires a smaller receptive field or high-level structure to maintain the same level of trade-off between details and noise suppression. In other words, a smaller receptive field and shallower layers are sufficient for the image quality optimization. By exploiting this observation, the SIME network 205 can generate multi-exposure image frames in a more computationally-efficient manner compared to executing a SISE network multiple times.

Although FIG. 3 illustrates certain additional details of the SIME network 205, various changes may be made to FIG. 3. For example, the number of stages, convolutional layers, upsampling and downsampling layers, and other components could vary and could be fewer or greater in number.

Figure 4A:
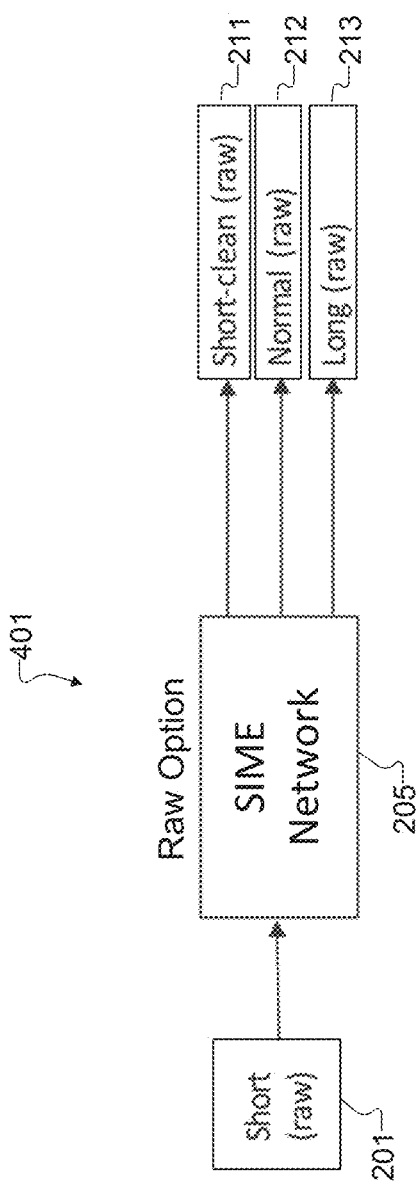
FIGS. 4A and 4B illustrate example options for execution of the SIME network of FIG. 3 in accordance with this disclosure.
Figure 4B:
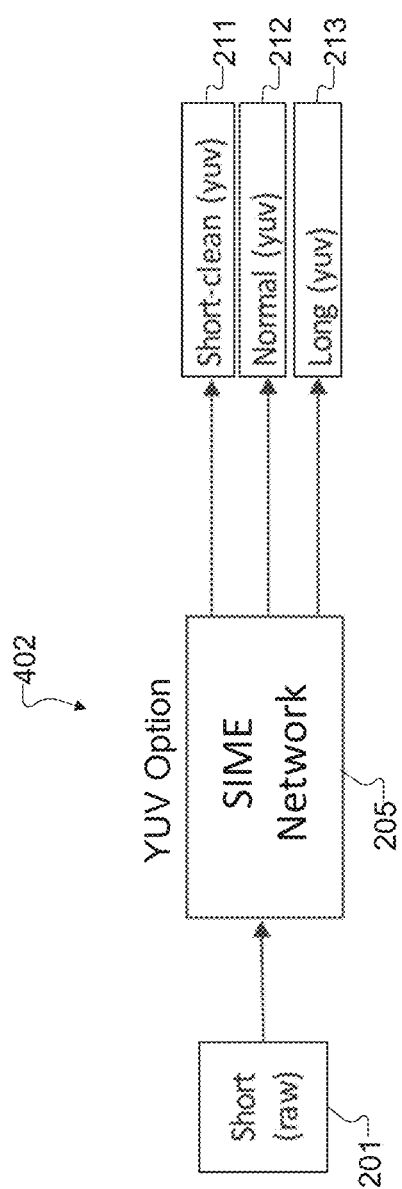

FIGS. 4A and 4B illustrate example options for execution of the SIME network 205 of FIG. 3 in accordance with this disclosure. As shown in FIGS. 4A and 4B, the SIME network 205 can operate according to different options 401-402 for execution to generate output image frames in different formats. Stated differently, depending on the operations performed by the SIME network 205, there can be different formats for the output image frames 211-213.

In both options 401-402, the SIME network 205 receives the input image frame 201 in a raw format, which contains minimally processed data from an image sensor. The raw format may also be associated with the Bayer image domain. As indicated at option 401, the SIME network 205 operates to generate the output image frames 211-213 in the same raw format as the input image frame 201. In contrast, as indicated at option 402, as the SIME network 205 generates the output image frames 211-213, it performs conversion operations to generate the output image frames 211-213 in YUV format, which is a format often used for storage of images. Training can be performed on the SIME network 205 to allow the SIME network 205 to generate output images in either raw format or YUV format.

Although FIGS. 4A and 4B illustrate examples of options for execution of the SIME network 205 of FIG. 3, various changes may be made to FIGS. 4A and 4B. For example, the SIME network 205 may be compatible with other image formats, such as RGB.

The training of convolutional neural networks usually requires the use of a large number of training examples. In the case of the SIME network 205, the goal of the training is to tune the SIME network 205 so that the SIME network 205, when given a single input image frame, produces multiple output image frames at different exposure levels.

Figure 5:
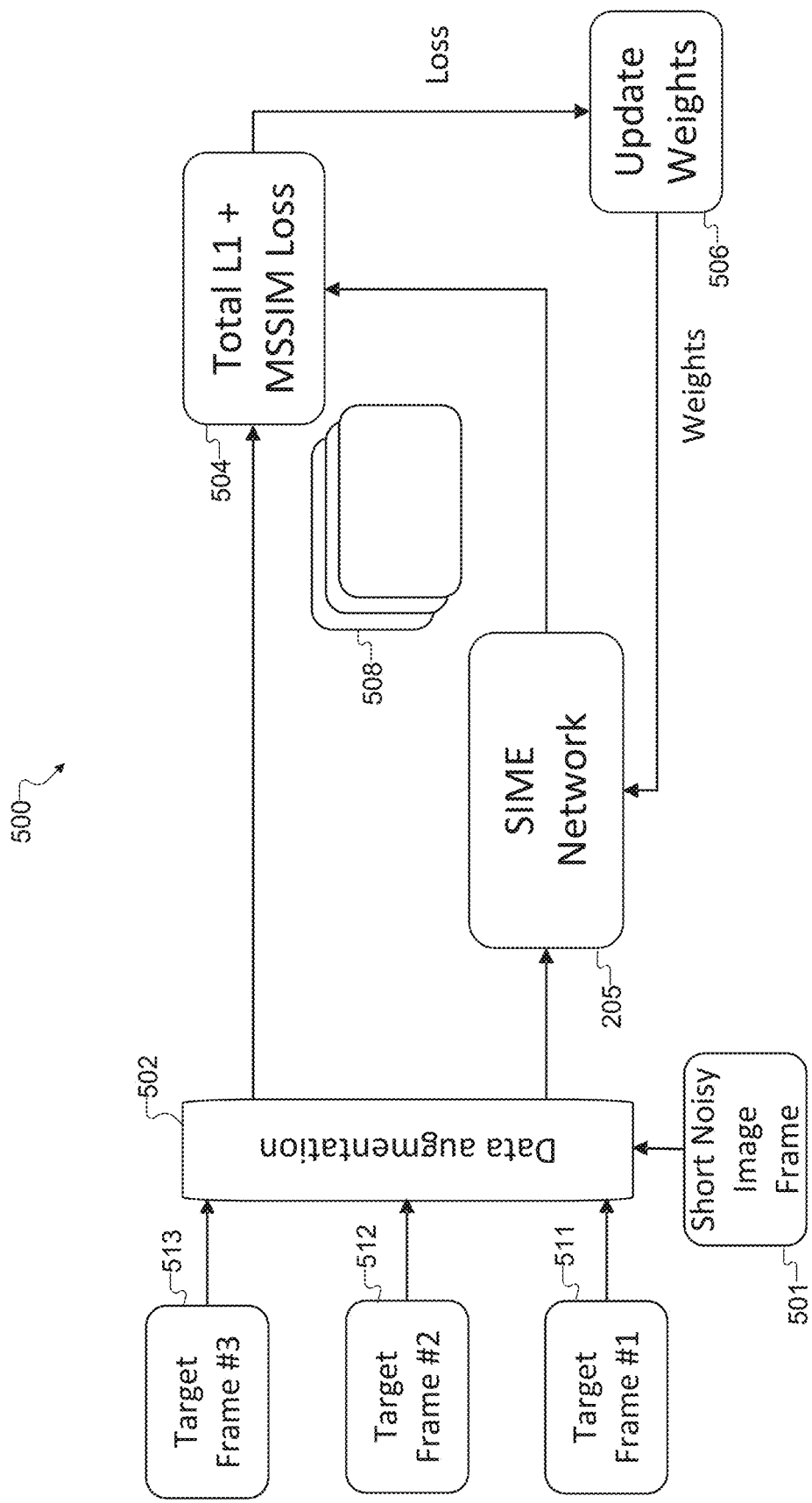
FIG. 5 illustrates an example process for training a SIME network in accordance with this disclosure.

FIG. 5 illustrates an example process 500 for training a SIME network 205 in accordance with this disclosure. Using the process 500, the SIME network 205 can be trained to generate multi-exposure frames that match predetermined target frames based solely on a single input frame. The constraints from static scenes and a single input frame ensure that output frames generated by the SIME network 205 are perfectly aligned despite being at different exposure levels. For ease of explanation, the process 500 is described as involving the use of the server 106 of FIG. 1 and the SIME network 205 shown in FIGS. 2 and 3. However, the process 500 could be used with any other suitable device and any other suitable convolutional neural network architecture.

During the training process 500, the server 106 receives multiple initial image frames of a scene, including a short noisy frame 501 and multiple target frames 511-513. The short noisy frame 501 represents an input frame similar to the input image frame 201 of FIG. 2, which is also a short noisy frame. The target frames 511-513 include a clean short frame 511, a normal frame 512, and a long frame 513. The target frames 511-513 correspond to the output image frames 211-213 of FIG. 2 and represent "goals" for the SIME network 205 when training using the training process 500.

In some embodiments, the initial image frames 501 and 511-513 are captured using a camera on a tripod and triggered with voice commands or other wireless commands to avoid touching the camera (and thus slightly moving the camera during capture). This ensures that the image frames 501 and 511-513 are aligned as much as possible. In some embodiments, the clean short frame 511 is obtained by darkening the normal frame 512 to the same exposure level as the short noisy frame 501.

To enhance training, the server 106 can perform a data augmentation function 502 on the image frames 501 and 511-513. The data augmentation function 502 increases the size of the collection of training data by generating additional images of a scene other than the original image frames 501 and 511-513, which can lead to a better training result overall. For example, the data augmentation function 502 can include transforming the original image frames in different ways, such as flipping the initial image frames 501 and 511-513 along the x and/or y axes, rotating the initial image frames 501 and 511-513 by one or more angles (such as 90°, 180°, or 270°), and the like. The transformed images can be used in the network training process 500 along with the initial image frames 501 and 511-513 to create the appearance of a greater amount of data.

Once the initial image frames 501 and 511-513 (and any additional image training data obtained by the data augmentation function 502) are obtained, the server 106 trains the SIME network 205 by operating in an iterative manner to generate output images that are similar to the target image frames 511-513. During each iteration through the training process 500, the SIME network 205 generates image frames 508. Ideally, during multiple iterations through the training process 500, the SIME network 205 generally improves the generation of the image frames 508 and moves towards producing the target image frames 511-513.

For each iteration through the training process 500, the server 106 may perform a loss computation function 504, which computes a total loss function for the SIME network 205. The loss helps guide updating of weights of the SIME network 205, such as via a gradient descent technique. For example, the server 106 can compute the total loss function as a weighted sum of two component loss functions, namely L1 loss and multi-scale structural similarity measure (MS-SIM) loss. The L1 loss can be used to ensure color correctness by penalizing color mismatch between the target frames 511-513 and the image frames 508 generated in each training iteration. In particular, L1 loss is the L1 norm (or Manhattan Distance) between the target frames 511-513 and the image frames 508 generated in each training iteration. The MSSIM loss is used to ensure detail preservation in the output by penalizing detail mismatches between the target frames 511-513 and the image frames 508 generated in each training iteration. The total loss function may represent a linear combination of the two component loss functions to ensure that the image frames 508 and target frames 511-513 are matching in both color and detail.

Based on the computed loss, the electronic device 101 adjusts the SIME network 205 by performing a weight update function 506 to update the weights used by the SIME network 205. For example, the server 106 can alter the weights used in the convolutional layers 311 and 314 or other parameters of the SIME network 205. Once the updated weights are determined, the server 106 performs another iteration of training for the SIME network 205. The overall goal of the training process 500 is to reduce or minimize the value of the loss function.

Although FIG. 5 illustrates one example of a process 500 for training a SIME network 205, various changes may be made to FIG. 5. For example, the SIME network 205 may be trained in any other suitable manner, which may or may not involve the use of various features like data augmentation and a combination loss function.

Figure 6:
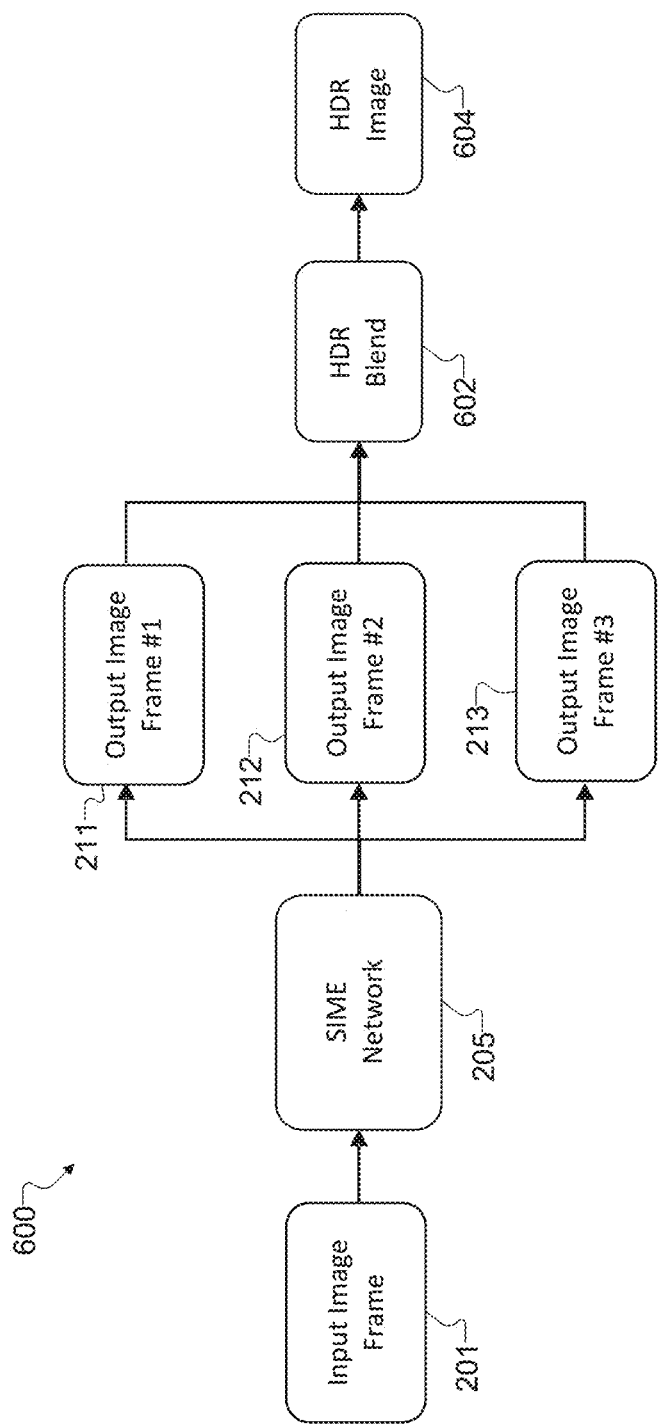
FIG. 6 illustrates an example process for using multiple output image frames generated by a SIME network to produce a ghost-free HDR frame in accordance with this disclosure.

FIG. 6 illustrates an example process 600 for using multiple output image frames generated by a SIME network 205 to produce a ghost-free HDR frame in accordance with this disclosure. For ease of explanation, the process 600 is described as involving the use of the electronic device 101 of FIG. 1 and the SIME network 205 shown in FIGS. 2 and 3. However, the process 600 could be used with any other suitable device and any other suitable convolutional neural network architecture.

As shown in FIG. 6, the electronic device 101 receives a single input image frame 201 and uses the SIME network 205 to generate multiple output image frames 211-213 using the process described above. The electronic device 101 inputs the multiple output image frames 211-213 to an HDR blending operation 602, which processes the output image frames 211-213 to produce an HDR image 604. The HDR blending operation 602 applies an HDR blending algorithm to the output image frames 211-213 to generate the HDR image 604 with reduced or minimal artifacts since the output image frames 211-213 are perfectly aligned.

The HDR blending operation 602 may use any suitable technique to generate an HDR image 604 based on multiple image frames 211-213, such as by blending the image frames 211-213. For example, one technique for image blending compares individual pixels in the same location of different image frames and combines the compared pixels. Repeating this over all pixels of the output image frames 211-213 leads to the generation of the HDR image 604. Because the image frames 211-213 are aligned, the HDR blending operation 602 only needs to analyze exposure differences between the output image frames 211-213. This avoids complicated (and fragile) deghosting mechanisms to analyze both exposure and motion differences jointly, which is typically required when image frames are not aligned. Achieving an HDR effect in this manner ensures that the fundamental conflict between exposure and motion differences does not exist, thereby providing a robust and artifact-free HDR result. Note, however, that there are a number of possible techniques for blending image frames, and the HDR blending operation 602 can support any suitable technique or techniques for combining image frames.

While it is possible to hypothesize a system that uses a single-input HDR network to achieve a similar effect as the process 600 (which combines the SIME network 205 and the HDR blending operation 602), such a system would inherently suffer from several fundamental drawbacks. For example, a single-input HDR network is closed, so HDR quality (based on specific image details) cannot be improved further with additional captured frames. As a consequence, the HDR quality achieved by such a network is limited by the quality of its HDR ground truths or targets. Obtaining realistic HDR targets for training a single-input HDR network is expensive and does not scale well for productization. For instance, HDR targets would need to be obtained by a high dynamic range sensor, which may not be feasible on handheld devices. Also, the HDR targets are obtained by a traditional HDR blending algorithm, which becomes the limiting factor. Further, the process of synthesizing the low dynamic range (LDR) inputs from the HDR images is limited by the synthesis model. In contrast, it is straightforward to obtain realistic, high-quality training data for the SIME network 205 as discussed above. In addition, the multi-exposure approach of the process 600 provides an open system with the potential for reusing (or extending the use of) the HDR backend to improve quality.

Although FIG. 6 illustrates one example of a process 600 for using multiple output image frames generated by a SIME network 205 to produce a ghost-free HDR frame, various changes may be made to FIG. 6. For example, the SIME network 205 may generate two or more than three image frames.

As discussed above, the processes 200 and 600 use one input image frame 201. However, in some scenarios, the input image frame 201 may not contain a lot of fine detail. To address this possibility, some embodiments of this disclosure provide a process that can use more than one input image frame so that the additional image frame(s) can supplement the image frame 201. Such a process, as discussed below, can focus on the areas of the short image where there is little or no motion to minimize the possibility of blur.

Figure 7A:
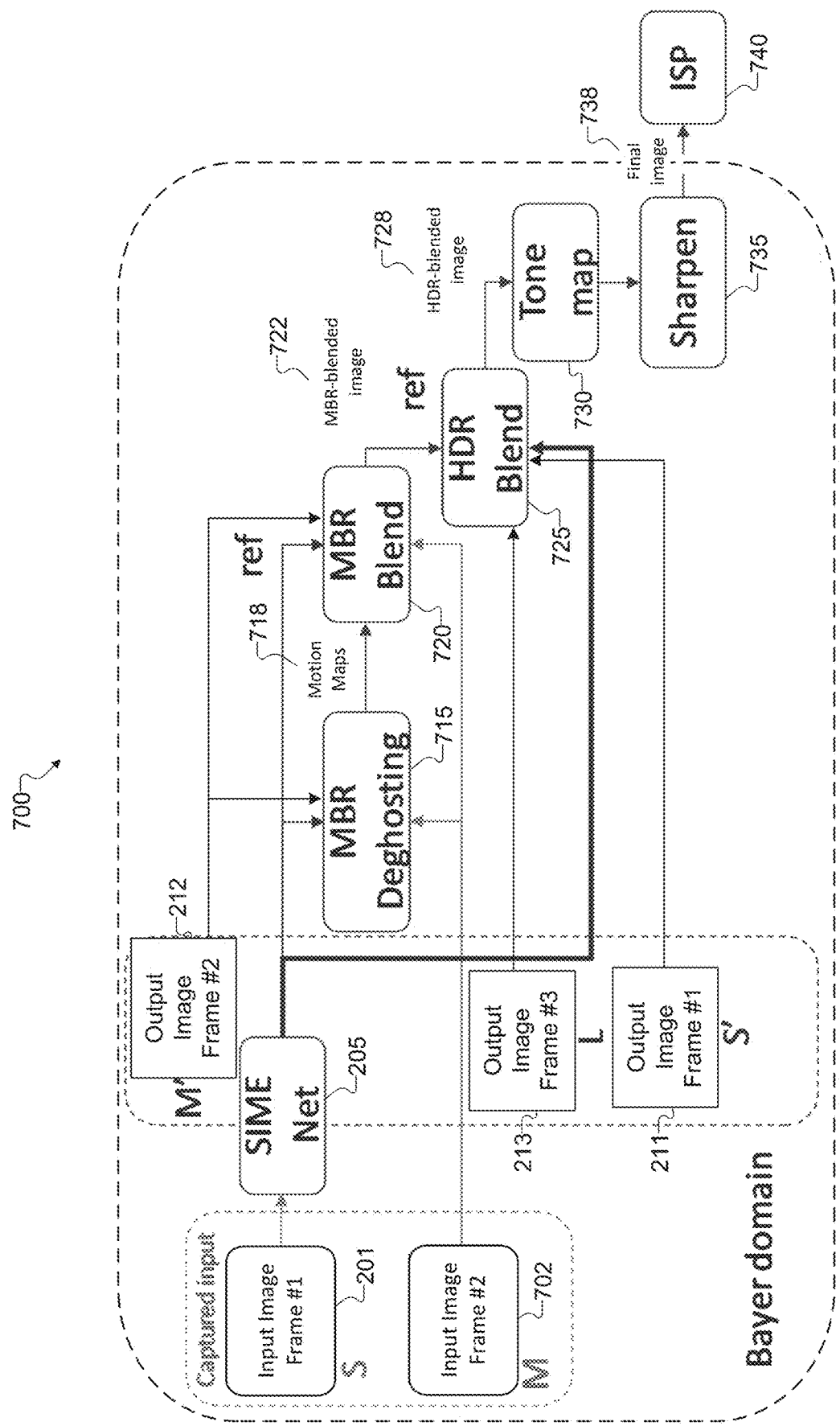
FIGS. 7A through 7D illustrate another example process for using multiple output image frames generated by a SIME network to produce a ghost-free HDR frame in accordance with this disclosure.
Figure 7B:
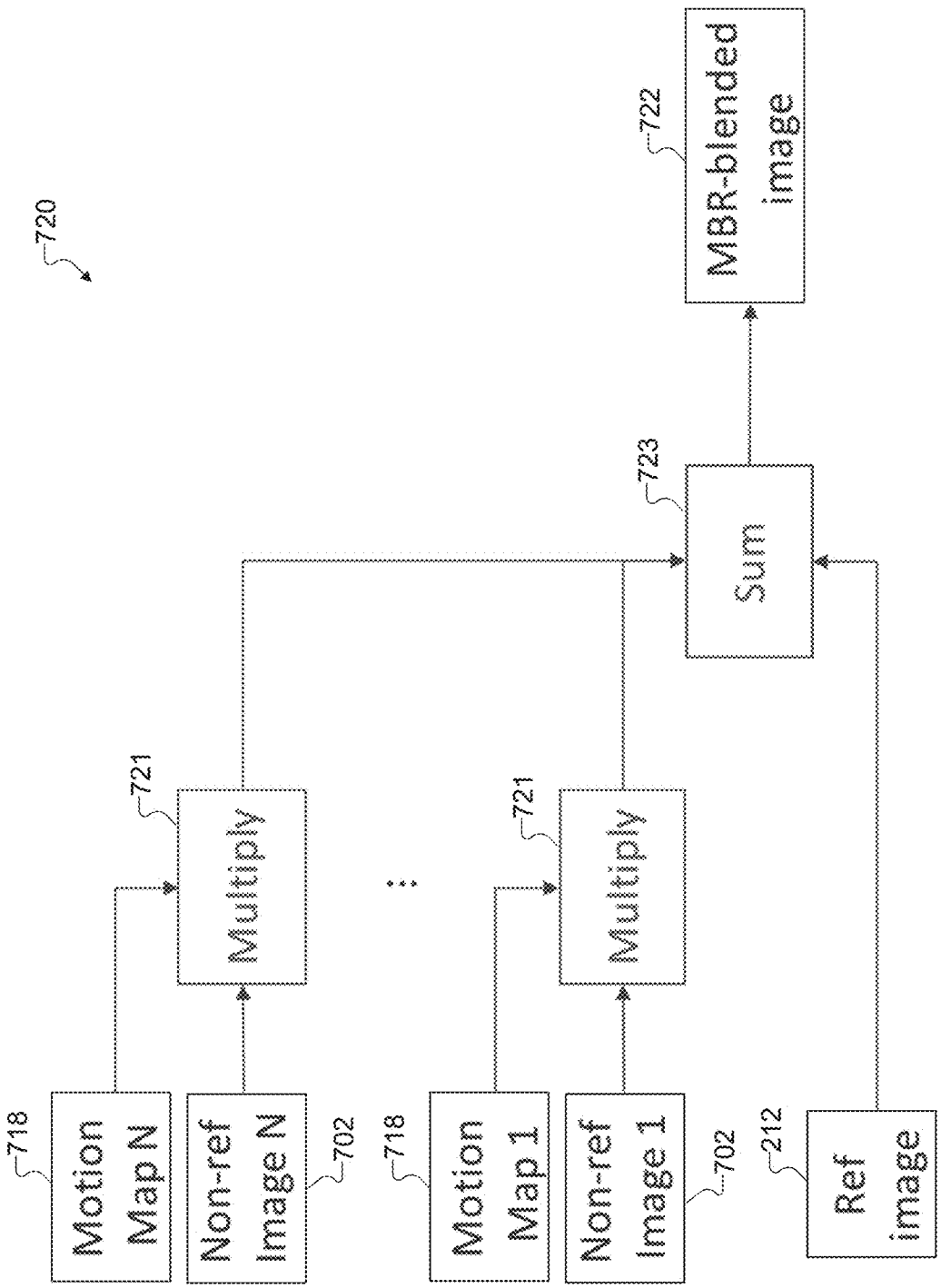
Figure 7C:
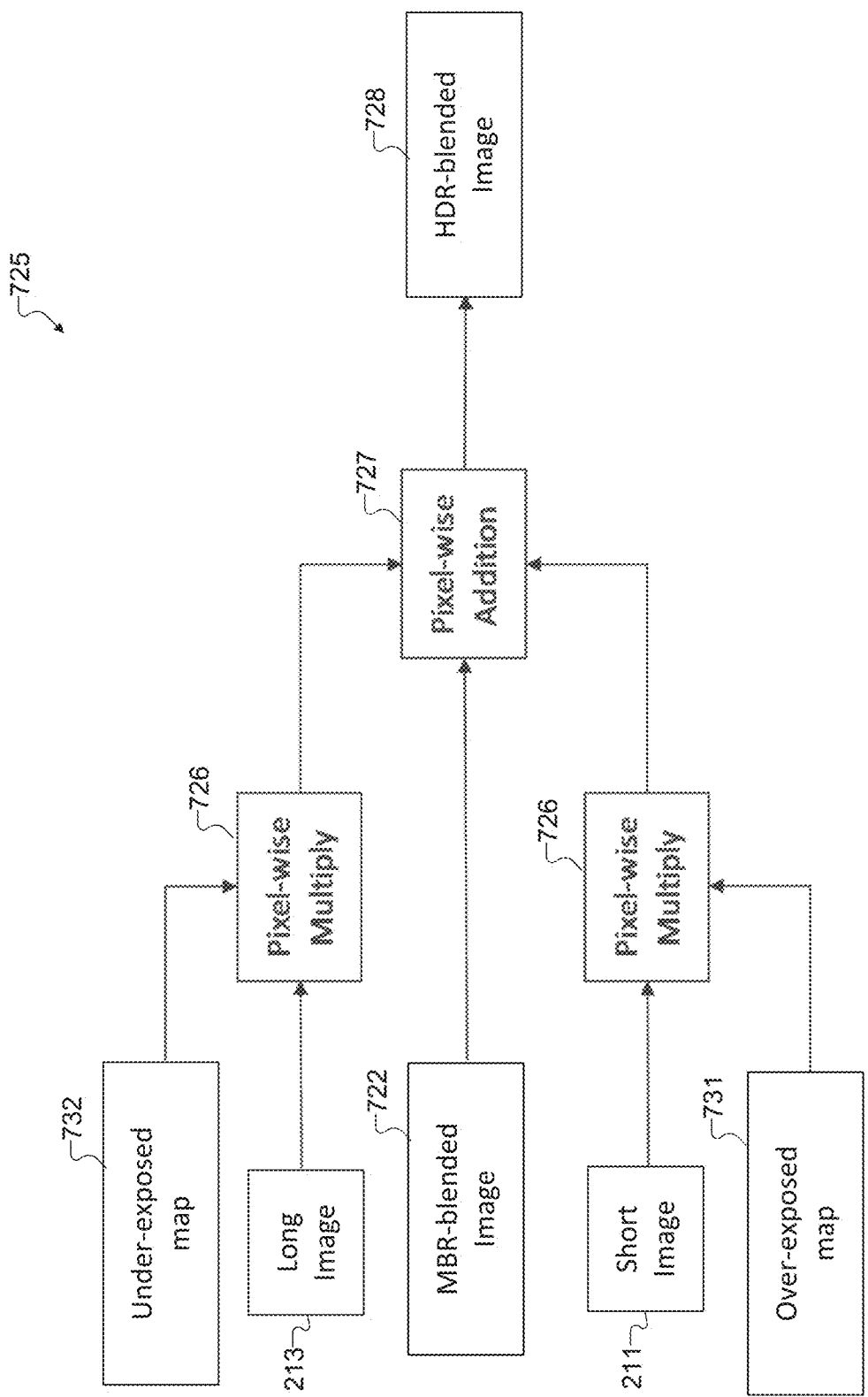
Figure 7D:
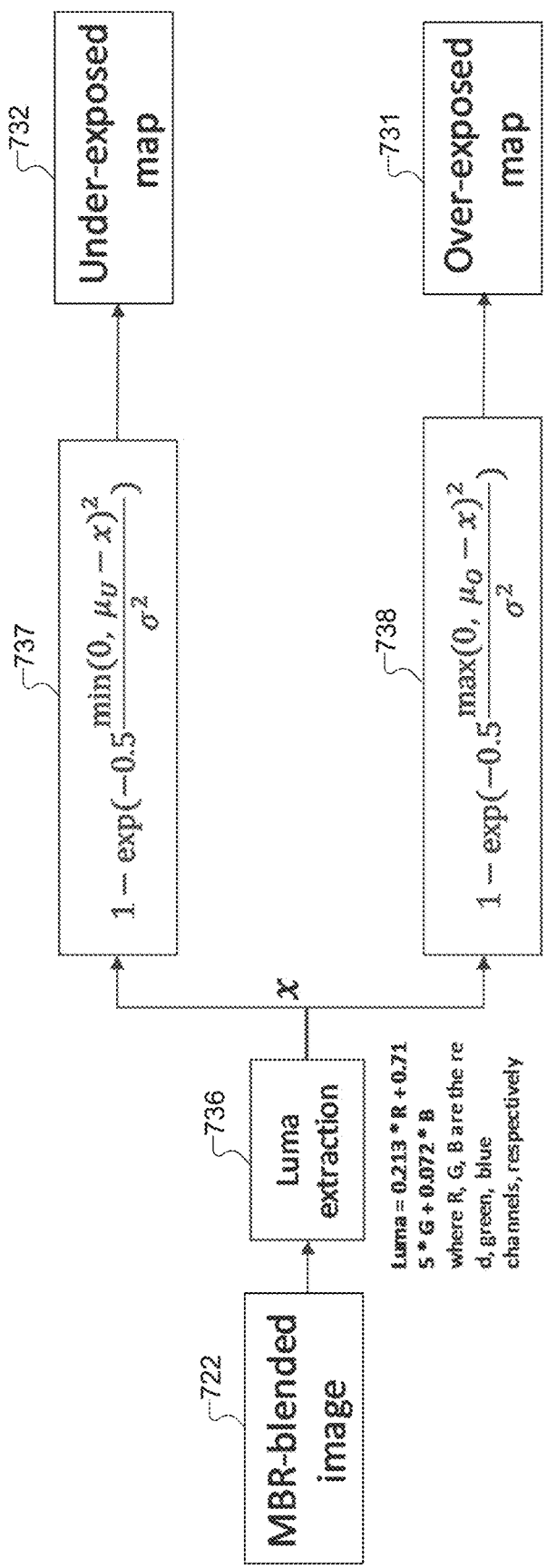

FIGS. 7A through 7D illustrate another example process 700 for using multiple output image frames generated by a SIME network 205 to produce a ghost-free HDR frame in accordance with this disclosure. The process 700 augments the SIME network 205 with one or more normal (medium exposure) frames 702 to improve the quality and details of HDR images. FIG. 7A illustrates an overview of the process 700, while FIGS. 7B through 7D illustrate certain operations of the process 700 in greater detail. For ease of explanation, the process 700 is described as involving the use of the electronic device 101 of FIG. 1 and the SIME network 205 shown in FIGS. 2 and 3. However, the process 700 could be used with any other suitable device and any other suitable convolutional neural network architecture.

As shown in FIG. 7A, the electronic device 101 receives multiple input image frames 201 and 702 captured with at least one image sensor. The input image frame 201 may be a short image frame (indicated with "S" in the figure), and the input image frame 702 may be a medium exposure image frame (indicated with "M") that is captured with the same image sensor or a different image sensor as the image frame 201. Because the input image frame 702 is brighter than the short frame 201, the input image frame 702 includes additional details that can be used to enhance a final HDR frame. While FIG. 7A depicts the use of one medium exposure image frame 702, this is merely one example, and other embodiments using more than one medium exposure image frame are possible and within the scope of this disclosure.

The electronic device 101 takes the short input image frame 201 and executes the SIME network 205 to generate multiple output image frames 211-213 as described above. The generated output image frames 211-213 include a short clean image frame 211 (indicated with "S"), a normal image frame 212 (which may have the appearance of medium exposure, indicated with "M"), and a long image frame 213 (indicated with "L"). The electronic device 101 takes the normal image frame 212 from the SIME network 205 and the medium-exposure input image frame 702 and performs a motion blur reduction (MBR) deghosting operation 715. The MBR deghosting operation 715 determines and analyzes motion statistics between the normal image frame 212 and the input image frame 702, with the normal image frame 212 being treated as the reference frame. Based on the motion statistics, the MBR deghosting operation 715 generates one or more motion maps 718. A motion map (also referred to as a deghosting map) generally identifies areas in image frames where motion is occurring and should be removed, thereby identifying the expected motion and noise level in the image frames. It is noted that there are a number of possible techniques for image deghosting, and the MBR deghosting operation 715 can support any suitable technique or techniques for image deghosting. In general, because the normal image frame 212 and the input image frame 702 can be at or near the same exposure level, the risk of ghost artifacts is minimal since deghosting at the same exposure level tends to be very reliable.

After the MBR deghosting operation 715, the electronic device 101 performs multiple blending operations, including a MBR blending operation 720 and a HDR blending operation 725. FIG. 7B illustrates example details of the MBR blending operation 720, and FIG. 7C illustrates example details of the HDR blending operation 725.

As shown in FIG. 7B, the MBR blending operation 720 uses the motion map(s) 718 from the MBR deghosting operation 715 to perform a weighted combination of the normal image frame 212 generated by the SIME network 205 (the reference image) and the input image frame(s) 702 (the non-reference image(s)). The MBR blending operation 720 is performed to bring in details from well-exposed static areas of the captured input image frame(s) 702 to a final HDR image frame. In some embodiments, each motion map 718 can include scalar values, each identifying a weight to be applied to a corresponding pixel value in an associated image frame. For example, the pixels in the input image frame(s) 702 can be scaled by the weights of the motion map(s) 718 using a multiplication function 721. The MBR blending operation 720 can weight individual pixels in the same location of different image frames based on their blending maps and combine the weighted pixels. Repeating this over all pixels of the image frames leads to the generation of a medium exposure MBR-blended image 722. The combination of the normal image frame 212 and the input image frame(s) 702 can use any suitable combination technique, such as a summing operation 723. It is noted that there are a number of possible techniques for MBR blending image frames, and the MBR blending operation 720 can support any suitable technique or techniques for MBR image blending. Also, while FIG. 7B shows the use of N non-reference images, it will be understood that N can equal one, meaning there is only one non-reference image 702 and one motion map 718.

As shown in FIG. 7C, the HDR blending operation 725 uses pixel-wise addition 727 to perform pixel-wise exposedness analysis on the medium exposure MBR-blended image 722 (output from the MBR blending operation 720), the short clean image frame 211, and the long image frame 213 (output from the SIME network 205). The MBR-blended image 722 serves as the reference in the HDR blending operation 725. The HDR blending operation 725 is performed to achieve the HDR effect, such as by brightening darker areas and recovering highlighted areas. The HDR blending operation 725 results in the generation of a HDR-blended image 728.

In some embodiments, the HDR blending operation 725 uses an over-exposed map 731 and an under-exposed map 732 to perform weighted combinations of the frames 211 and 213. The weighting operations can be performed using a pixel-wise multiplication function 726 or any other suitable weighting function. FIG. 7D illustrates an example process for generating the under-exposed map 732 and the over-exposed map 731 using a luma extraction function 736. As shown in FIG. 7D, the under-exposed map 732 is generated by thresholding the MBR-blended image 722 on pixels that are sufficiently dark. Here, the luma extraction function 736 uses a formula 737 that takes into account an under-exposed threshold $\mu_U$. Similarly, the over-exposed map 731 is generated by thresholding the MBR-blended image 722 on pixels that are sufficiently bright. Here, the luma extraction function 736 uses a formula 738 that takes into account an over-exposed threshold $\mu_O$. It is noted that there are a number of possible techniques for HDR blending image frames, and the HDR blending operation 725 can support any suitable technique or techniques for HDR image blending.

After the HDR blending operation 725, the electronic device 101 can perform a number of post-processing operations using the HDR-blended image 728. In this example, the HDR-blended image 728 undergoes a tone mapping operation 730 and a sharpening operation 735. The tone mapping operation 730 generally operates to apply a global tone mapping curve to the HDR-blended image 728 in order to brighten darker areas and increase image contrast in the HDR-blended image 728. The sharpening operation 735 generally operates to enhance edges in the HDR-blended image 728, such as with a 2D high pass filter or any other suitable filter. Various techniques for tone mapping and sharpening are known in the art. The output of the process 700 is at least one final image 738. The final image 738 generally represents a blend of the captured image frames 201, 702 after processing. The final image 738 is sent to an image signal processor (ISP) 740 and leaves the Bayer domain.

As described above, the process 700 combines the SIME network 205 with an HDR pipeline to achieve better quality in both details and artifact. Details in the normal image frame 212 from the SIME network 205 are improved by blending with one or more input image frames 702. The blending methodology employed in the process 700 includes the MBR deghosting operation 715 and the MBR blending operation 720. As discussed above, since deghosting at the same exposure level is well-behaved, the risk of ghosting artifacts is minimal. The HDR blending operation 725 (which in some conventional systems involves complicated deghosting to handle both exposure and motion differences) is straightforward here due to the use of the SIME network 205.

Although FIGS. 7A through 7D illustrate one example of a process 700 for using multiple output image frames generated by a SIME network 205 to produce a ghost-free HDR frame, various changes may be made to FIGS. 7A through 7D. For example, the SIME network 205 may generate two or more than three image frames.

Figure 8:
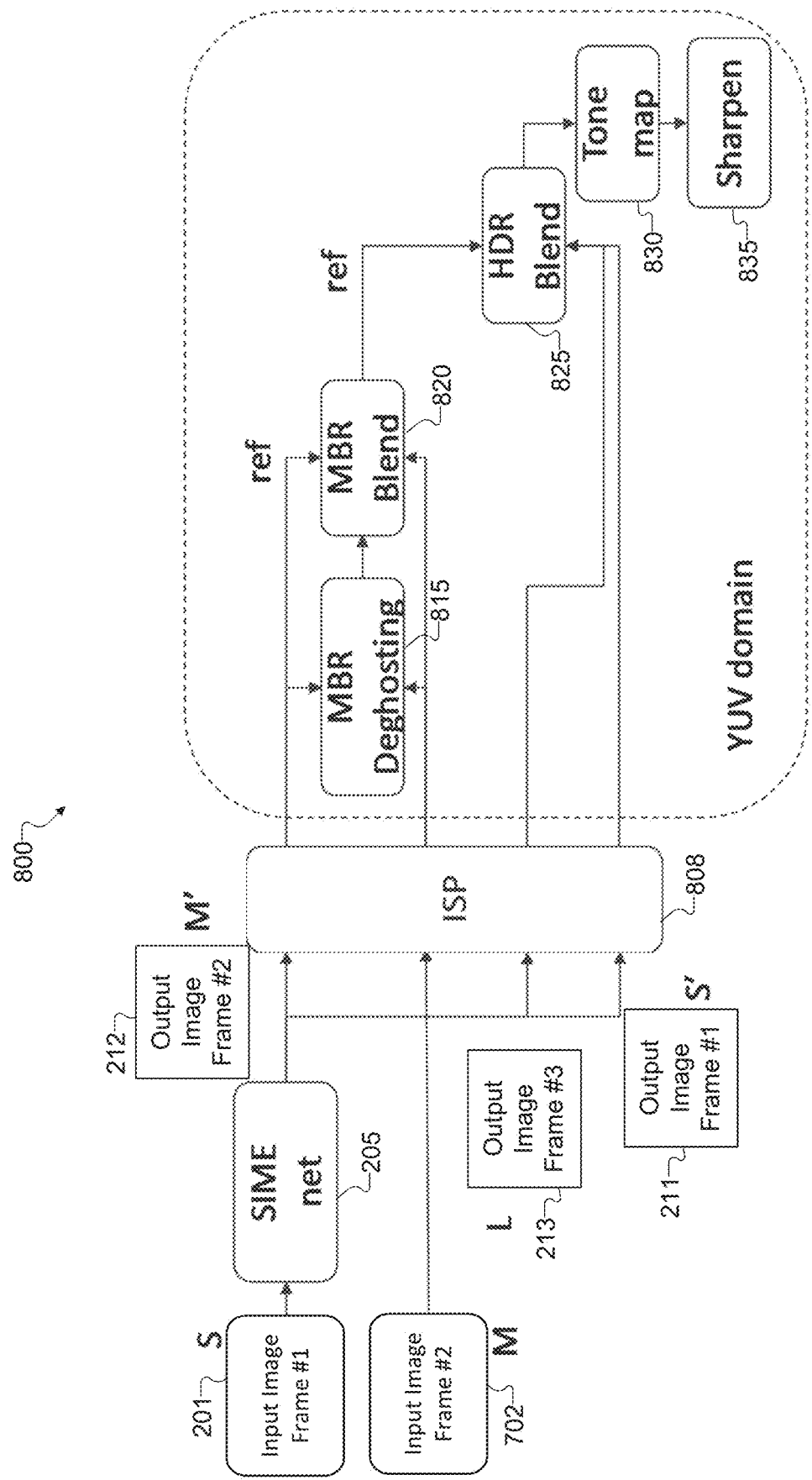
FIG. 8 illustrates yet another example process for using multiple output image frames generated by a SIME network to produce a ghost-free HDR frame in accordance with this disclosure.

FIG. 8 illustrates another example process 800 for using multiple output image frames generated by a SIME network 205 to produce a ghost-free HDR frame in accordance with this disclosure. For ease of explanation, the process 800 is described as involving the use of the electronic device 101 of FIG. 1 and the SIME network 205 shown in FIGS. 2 and 3. However, the process 800 could be used with any other suitable device and any other suitable convolutional neural network architecture.

As shown in FIG. 8, the electronic device 101 receives multiple image frames 201 and 702 captured with a camera. The input image frame 201 is a short image frame, and the input image frame 702 is a medium image frame. The electronic device 101 takes the short input image frame 201 and uses the SIME network 205 to generate multiple output image frames 211-213. In the process 800, the image capture and processing by the SIME network 205 are performed in the Bayer domain, similar to the corresponding operations of the process 700 of FIG. 7A through 7D. Thus, the output image frames 211-213 and the captured frames 201 and 702 are Bayer frames.

As described above, the process 700 features HDR processing that is also performed in the Bayer domain. In contrast, the process 800 of FIG. 8 features HDR processing that is performed in the YUV domain. As shown in FIG. 8, the output image frames 211-213 and the captured frames 201, 702 are passed to an ISP 808 and are converted to image frames in the YUV domain. The electronic device 101 then performs HDR processing operations using the image frames 201, 702 and 211-213 in the YUV domain. Specifically, the HDR processing includes a MBR deghosting operation 815, a MBR blending operation 820, a HDR blending operation 825, and post-processing operations that can include a tone mapping operation 830 and a sharpening operation 835. These operations 815-835 are similar to the corresponding operations 715-735 of the process 700 described above, but the operations 815-835 are performed in the YUV domain instead of the Bayer domain.

Although FIG. 8 illustrate one example of a process 800 for using multiple output image frames generated by a SIME network to produce a ghost-free HDR frame, various changes may be made to FIG. 8. For example, the SIME network 205 may generate two or more than three image frames. Also, the ISP 808 may convert the Bayer-domain data into other types of image data, such as RGB data.

Figure 9:
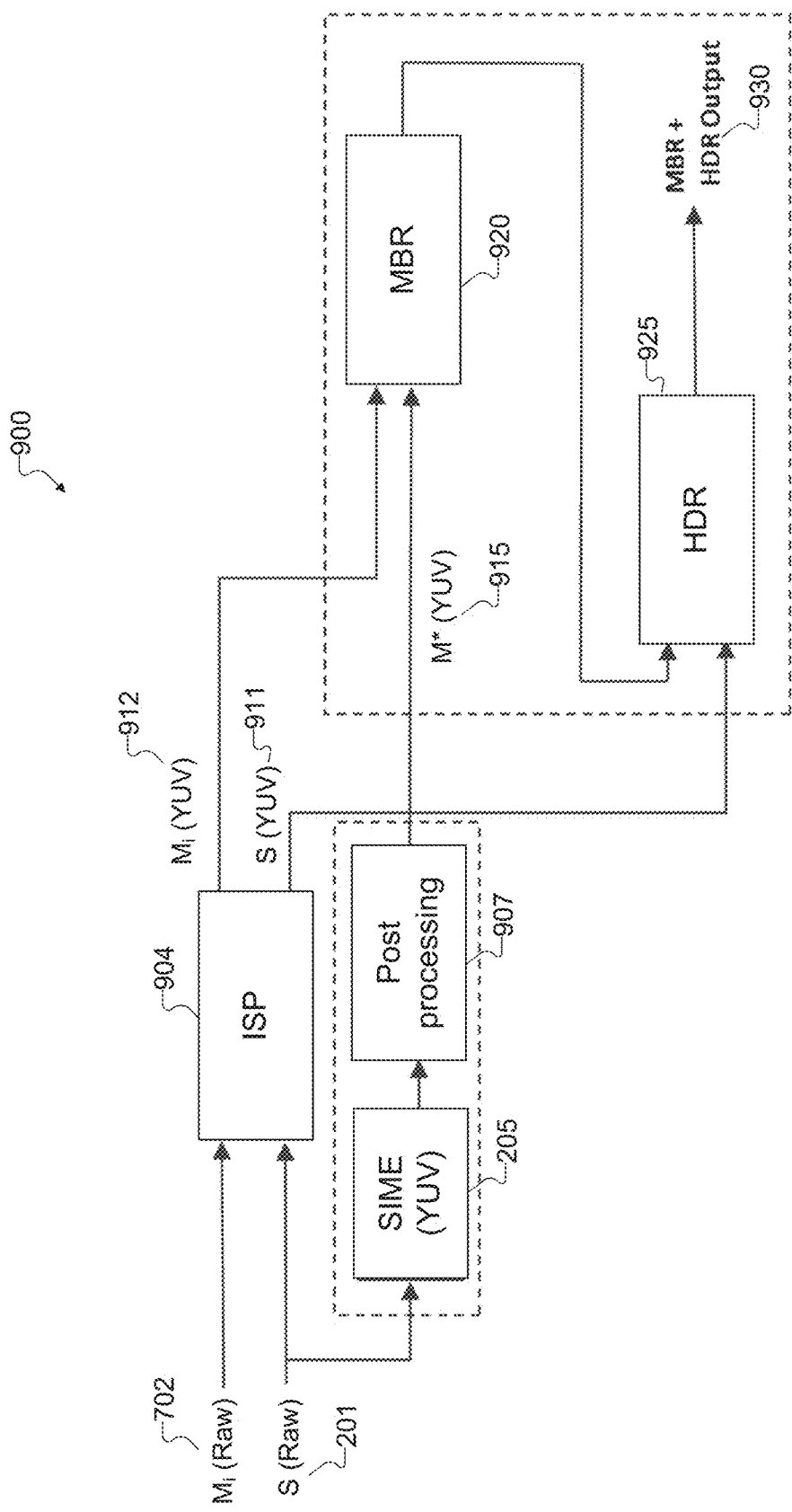
FIG. 9 illustrates an example process for changing an image domain using a SIME network in accordance with this disclosure.

FIG. 9 illustrates an example process 900 for changing an image domain using a SIME network 205 in accordance with this disclosure. For ease of explanation, the process 900 is described as involving the use of the electronic device 101 of FIG. 1. However, the process 900 could be used with any other suitable electronic device and in any suitable system.

As shown in FIG. 9, the electronic device 101 receives multiple image frames 201, 702. The input image frame 201 is a short image frame, and the input image frame 702 includes one or more medium image frames (denoted M where i is greater than or equal to one). The frames 201, 702 are in raw format, and the electronic device 101 takes the input image frames 201, 702 and provides the frames to an ISP 904. The ISP 904 processes the input image frames 201, 702 and converts the image frames from the raw domain to corresponding image frames 911-912 in the YUV domain.

The electronic device 101 also takes the short input image frame 201 and uses the SIME network 205 to generate one or more output image frames in the YUV domain, including a medium exposure output image frame. In contrast to some of the embodiments described above in which the SIME network 205 does not change the domain of the processed images, the SIME network 205 in FIG. 9 converts the domain of the short input image frame 201 from the raw (Bayer) domain to the YUV domain. In addition, the SIME network 205 can also perform other image processing operations, including de-mosaicing, noise removal, and color and tone correction. After processing in the SIME network 205, the electronic device 101 can perform one or more post-processing operations 907 on the medium exposure output image frame, such as dithering, adding synthetic noise, histogram matching, local tone mapping, other image processing operations. The output of the post-processing operations 907 includes a medium YUV frame 915 that substantially matches the medium input image frame 912 in brightness, color, and tone.

The electronic device 101 then uses the medium YUV frame 915 as a reference frame in multiple blending operations, including a MBR blending operation 920 and HDR blending operation 925. The MBR blending operation 920 takes the motion areas from the medium YUV frame 915 and the well-exposed static areas from the medium input image frame 912 and blends the images to bring in details from the static areas, similar to the MBR blending operation 920 of FIG. 7B. The HDR blending operation 925 then recovers the saturated areas from the short input image frame 911 coming from the ISP 904. The output of the process 900 includes at least one final image 930.

Although FIG. 9 illustrate one example of a process 900 for changing an image domain using a SIME network, various changes may be made to FIG. 9. For example, the SIME network 205 may generate two or more than three image frames. Also, data may be used in domains other than the YUV domain, such as when RGB data is used.

Figure 10:
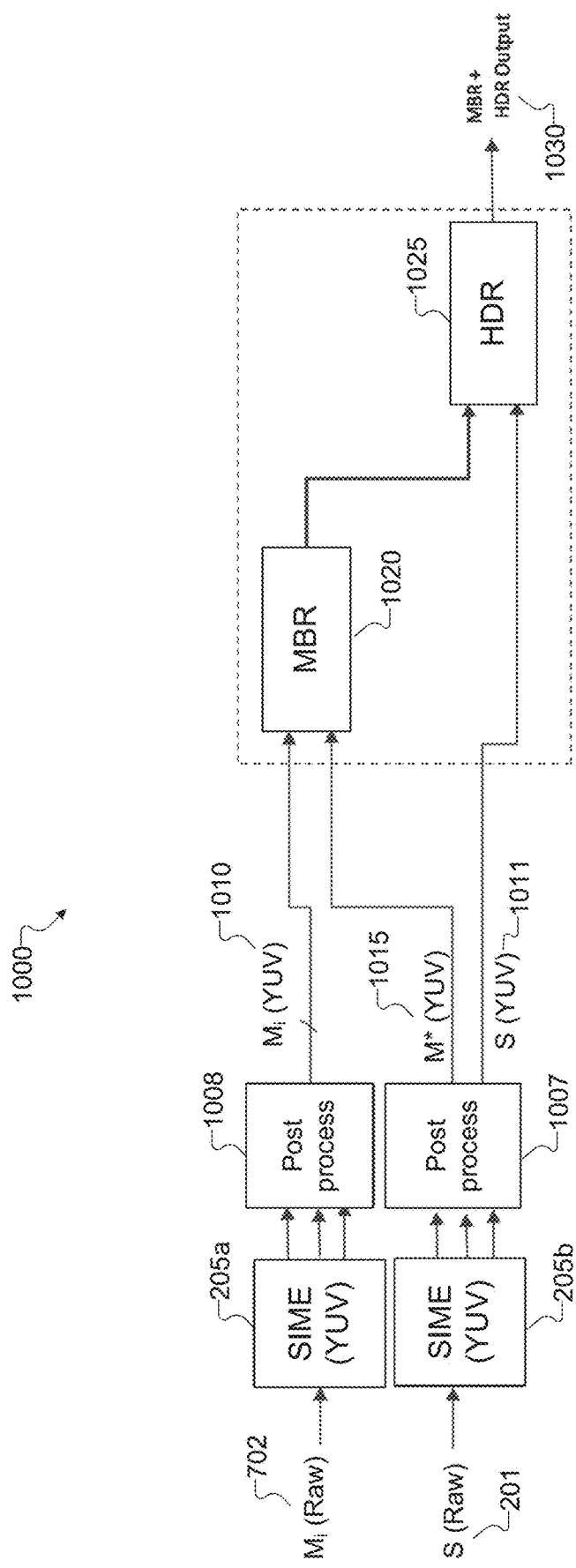
FIG. 10 illustrates another example process for changing an image domain using a SIME network in accordance with this disclosure.

FIG. 10 illustrates another example process 1000 for changing an image domain using a SIME network 205 in accordance with this disclosure. For ease of explanation, the process 1000 is described as involving the use of the electronic device 101 of FIG. 1. However, the process 1000 could be used with any other suitable electronic device and in any suitable system.

The process 1000 includes many components and operations that are the same as or similar to corresponding components and operations of the process 900 of FIG. 9. As shown in FIG. 10, the electronic device 101 receives multiple image frames 201, 702, where the input image frame 201 is a short image frame and the input image frame 702 includes one or more medium image frames. The frames 201, 702 are in raw format.

The electronic device 101 takes the short input image frame 201 and uses a first SIME network 205a to generate one or more output image frames in the YUV domain, including a medium exposure output image frame. This is similar to the operations performed by the SIME network 205 in FIG. 9. The electronic device 101 also takes the medium input image frame 702 and executes a second SIME network 205b to generate one or more output frames in the YUV domain, including a medium exposure output image frame. The SIME networks 205a-205b can also perform other image processing operations, including de-mosaicing, noise removal, and color and tone correction. After processing in the SIME networks 205a-205b, the electronic device 101 performs corresponding post-processing operations 1007-1008 on the medium exposure output image frames, which can include dithering, adding synthetic noise, histogram matching, local tone mapping, or other image processing operations. The output of the post-processing operations 1008 includes a first medium YUV frame 1010. The outputs of the post-processing operations 1007 include a short frame 1011 and a second medium YUV frame 1015 that substantially matches the first medium YUV frame 1010 in brightness, color, and tone.

The electronic device 101 then uses the second medium YUV frame 1015 as a reference frame in multiple blending operations, including a MBR blending operation 1020 and HDR blending operation 1025. These operations are the same as or similar to the corresponding operations of FIG. 9. The output of the process 1000 includes at least one final image 1030.

Although FIG. 10 illustrate one example of a process 1000 for changing an image domain using a SIME network, various changes may be made to FIG. 10. For example, each SIME network 205a-205b may generate two or more than three image frames. Also, data may be used in domains other than the YUV domain, such as when RGB data is used. Further, while the process 1000 depicts the use of multiple SIME networks 205a-205b, other embodiments could use one SIME network that processes different data sequentially (such as once for the short input image frame 201 and once for the medium input image frame 702).

Figure 11B:
Figure 11A:

FIGS. 11A, 11B, 12A, and 12B illustrate examples of benefits that can be realized using one or more of the embodiments of this disclosure. FIGS. 11A and 11B depict a comparison between an image 1101 of a daytime scene captured using a conventional image sensor and an image 1102 of the same daytime scene captured using one of the embodiments disclosed above. In FIG. 11A, the image 1101 was captured and processed using a conventional HDR operation. As evident by FIG. 11A, the image 1101 has poor HDR results, including a subject that is too dark. In contrast, the image 1102 in FIG. 11B was captured and processed using a SIME network and MBR and HDR blending and deghosting operations as described above. The resulting image 1102 provides superior HDR results compared to the image 1101 and also exhibits good MBR effects.

Similarly, FIGS. 12A and 12B depict a comparison between an image 1201 of an evening scene captured using a conventional image sensor and an image 1202 of the same evening scene captured using one of the embodiments disclosed above. In FIG. 12A, the image 1201 was captured and processed using a long exposure. As evident by FIG. 12A, the image 1201 has poor results, including a great amount of noise throughout the image as evident by the grainy quality of the image 1201. In contrast, the image 1202 in FIG. 12B was captured and processed using a SIME network, which processes a short exposure frame. As evident in FIG. 12B, the image 1202 is much clearer and exhibits very little noise.

Although FIGS. 11A, 11B, 12A, and 12B illustrate examples of benefits that can be realized, various changes may be made to these figures. For example, images can be captured of numerous scenes under different lighting conditions, and these figures do not limit the scope of this disclosure. These figures are merely meant to illustrate example types of benefits that might be obtainable using the techniques described above.

Figure 13:
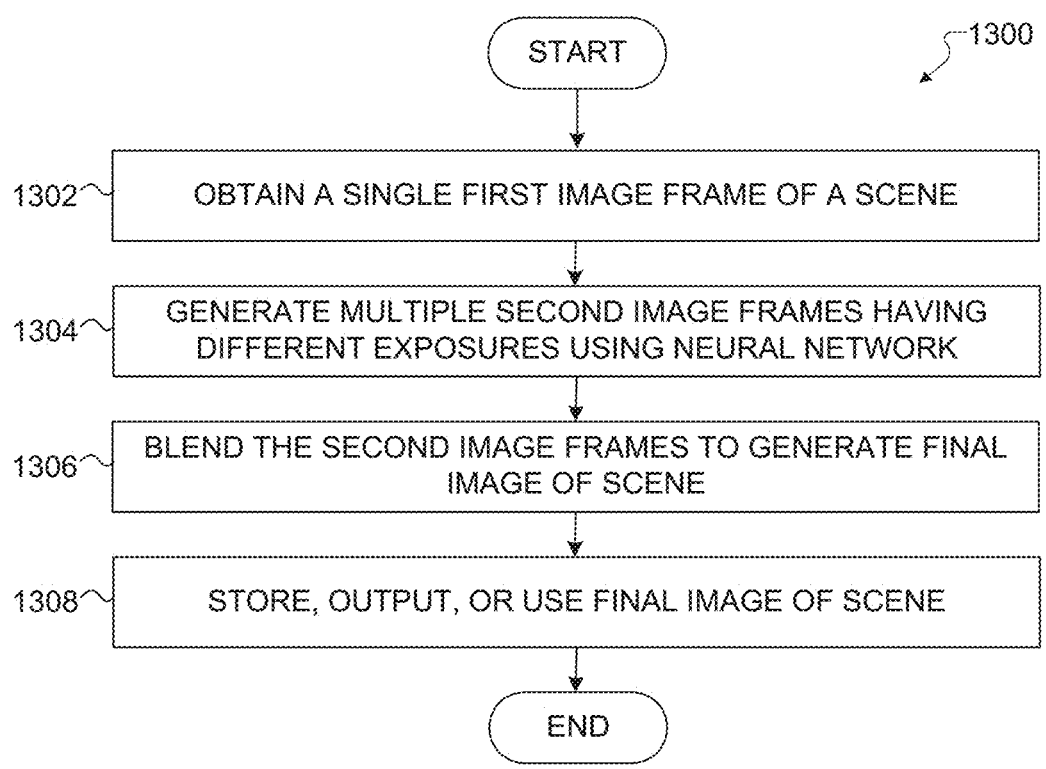
FIG. 13 illustrates an example method for generating multi-exposure frames using a SIME network in accordance with this disclosure.

FIG. 13 illustrates an example method 1300 for generating multi-exposure frames using a SIME network in accordance with this disclosure. For ease of explanation, the method 1300 shown in FIG. 13 is described as involving the use of the electronic device 101 of FIG. 1. However, the method 1300 shown in FIG. 13 could be used with any other suitable electronic device and in any suitable system.

As shown in FIG. 13, a first image frame of a scene is obtained using at least one image sensor of an electronic device at step 1302. This could include, for example, the processor 120 of the electronic device 101 receiving a capture request and causing a camera (sensor 180) to capture the input image frame 201. In some embodiments, the first image frame is a short exposure image frame.

Multiple second image frames simulated to have different exposures are generated from the first image frame using a convolutional neural network at step 1304. This could include, for example, the processor 120 of the electronic device 101 executing the SIME network 205 to generate the multiple output image frames 211-213. As a result of the processing performed by the SIME network 205, the output image frames 211-213 may be substantially or perfectly aligned with the input image frame 201. Thus, one or more objects in the scene in each second image frame are aligned with one or more corresponding objects in the scene in at least one other second image frame and are also aligned with one or more corresponding objects in the scene in the first image frame.

In some embodiments, the second image frames include a first generated image frame having a normal exposure, a second generated image frame having a second exposure that is longer than the normal exposure, and a third generated image frame having a third exposure that is shorter than the normal exposure. Also, in some embodiments, a convolutional neural network in the SIME network 205 performs operations in a common encoder path for all of the multiple second image frames and performs distinct operations in separate decoder paths for each of the multiple second image frames. As described above, each of the decoder paths may include at least one decoder stage that includes a resize or upsampling layer, a convolutional layer, and a separable convolutional layer. The decoder path for the second generated image frame can include more decoder stages than the decoder path for the first generated image frame, and the decoder path for the third generated image frame can include fewer decoder stages than the decoder path for the first generated image frame. Further, in some embodiments, the first image frame is in a raw format, and the convolutional neural network performs operations for raw-to-YUV conversion such that the multiple second image frames are in a YUV format.

A final image of the scene is generated by blending the multiple second image frames at step 1306. This could include, for example, the processor 120 of the electronic device 101 performing an HDR blending operation to produce a single-frame HDR image. This could also or alternatively include the processor 120 performing a MBR deghosting operation, MBR blending operation, and HDR blending operation to generate a single-frame HDR image.

The final image of the scene is stored, output, or used in some manner at step 1308. This could include, for example, the processor 120 of the electronic device 101 displaying the final image of the scene on the display 160 of the electronic device 101. This could also include the processor 120 of the electronic device 101 saving the final image of the scene to a camera roll stored in a memory 130 of the electronic device 101. This could further include the processor 120 of the electronic device 101 attaching the final image of the scene to a text message, email, or other communication to be transmitted from the electronic device 101. Of course, the final image of the scene could be used in any other or additional manner.

Although FIG. 13 illustrates one example of a method 1300 for generating multi-exposure frames using a SIME network, various changes may be made to FIG. 13. For example, while shown as a series of steps, various steps in FIG. 13 could overlap, occur in parallel, occur in a different order, or occur any number of times.

It should be noted that while various operations are described above as being performed using one or more devices, those operations can be implemented in any suitable manner. For example, each of the functions in the electronic device 101 or server 106 can be implemented or supported using one or more software applications or other software instructions that are executed by at least one processor 120 of the electronic device 101 or server 106. In other embodiments, at least some of the functions in the electronic device 101 or server 106 can be implemented or supported using dedicated hardware components. In general, the operations of each device can be performed using any suitable hardware or any suitable combination of hardware and software/firmware instructions.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
obtaining, using at least one image sensor of an electronic device, a first image frame of a scene;

using a convolutional neural network to generate, from the first image frame, multiple second image frames simulated to have different exposures, wherein one or more objects in the scene in each second image frame are aligned with one or more corresponding objects in the scene in at least one other second image frame and are aligned with one or more corresponding objects in the scene in the first image frame; and blending the multiple second image frames to generate a final image of the scene.

2. The method of claim 1, wherein the multiple second image frames comprise:
a first generated image frame simulated to have a specified exposure;
a second generated image frame simulated to have a second exposure that is longer than the specified exposure; and
a third generated image frame simulated to have a third exposure that is shorter than the specified exposure.

3. The method of claim 2, wherein the convolutional neural network performs operations in a common encoder path for all of the multiple second image frames and performs distinct operations in different decoder paths for different ones of the multiple second image frames.

4. The method of claim 3, wherein each of the decoder paths comprises at least one decoder stage that includes an upsampling layer, a convolutional layer, and a separable convolutional layer.

5. The method of claim 3, wherein:
the decoder path for the second generated image frame comprises more decoder stages than the decoder path for the first generated image frame; and
the decoder path for the third generated image frame comprises fewer decoder stages than the decoder path for the first generated image frame.

6. The method of claim 1, wherein:
the first image frame of the scene is in a raw format;
the multiple second image frames are in a YUV format; and
the convolutional neural network performs raw-to-YUV conversion.

7. The method of claim 1, wherein blending the multiple second image frames to generate the final image comprises:
performing at least one of a motion blur reduction (MBR) deghosting operation, a MBR blending operation, or a high dynamic range (HDR) blending operation using at least some of the multiple second image frames.

8. The method of claim 1, wherein the convolutional neural network is trained by:
obtaining multiple initial image frames of a scene including multiple target image frames;
generating output images;
computing a loss function indicating differences between the target image frames and the generated output images;
updating weights associated with parameters of the convolutional neural network based on the loss function; and
repeating the generating, computing, and updating operations one or more times in an iterative manner.

9. An electronic device comprising:
at least one image sensor; and
at least one processing device configured to:
obtain a first image frame of a scene using the at least one image sensor;
use a convolutional neural network to generate, from the first image frame, multiple second image frames simulated to have different exposures, wherein one or more objects in the scene in each second image frame are aligned with one or more corresponding objects in the scene in at least one other second image frame and are aligned with one or more corresponding objects in the scene in the first image frame; and
blend the multiple second image frames to generate a final image of the scene.

10. The electronic device of claim 9, wherein the multiple second image frames comprise:
a first generated image frame simulated to have a specified exposure;
a second generated image frame simulated to have a second exposure that is longer than the specified exposure; and
a third generated image frame simulated to have a third exposure that is shorter than the specified exposure.

11. The electronic device of claim 10, wherein the convolutional neural network is configured to perform operations in a common encoder path for all of the multiple second image frames and to perform distinct operations in different decoder paths for different ones of the multiple second image frames.

12. The electronic device of claim 11, wherein each of the decoder paths comprises at least one decoder stage that includes an upsampling layer, a convolutional layer, and a separable convolutional layer.

13. The electronic device of claim 11, wherein:
the decoder path for the second generated image frame comprises more decoder stages than the decoder path for the first generated image frame; and
the decoder path for the third generated image frame comprises fewer decoder stages than the decoder path for the first generated image frame.

14. The electronic device of claim 9, wherein:
the first image frame of the scene is in a raw format;
the multiple second image frames are in a YUV format; and
the convolutional neural network is configured to perform raw-to-YUV conversion.

15. The electronic device of claim 9, wherein, to blend the multiple second image frames to generate the final image, the at least one processing device is configured to perform at least one of a motion blur reduction (MBR) deghosting operation, a MBR blending operation, or a high dynamic range (HDR) blending operation using at least some of the multiple second image frames.

16. The electronic device of claim 9, wherein the convolutional neural network is trained by:
obtaining multiple initial image frames of a scene including multiple target image frames;
generating output images similar to the target image frames;
computing a loss function indicating differences between the target image frames and the generated output images;
updating weights associated with parameters of the convolutional neural network based on the loss function; and
repeating the generating, computing, and updating operations one or more times in an iterative manner.

17. A non-transitory machine-readable medium containing instructions that when executed cause at least one processor of an electronic device to:
obtain a first image frame of a scene using at least one image sensor of the electronic device;

use a convolutional neural network to generate, from the first image frame, multiple second image frames simulated to have different exposures, wherein one or more objects in the scene in each second image frame are aligned with one or more corresponding objects in the scene in at least one other second image frame and are aligned with one or more corresponding objects in the scene in the first image frame; and blend the multiple second image frames to generate a final image of the scene.

18. The non-transitory machine-readable medium of claim 17, wherein the multiple second image frames comprise:

a first generated image frame simulated to have a specified exposure;

a second generated image frame simulated to have a second exposure that is longer than the specified exposure; and a third generated image frame simulated to have a third exposure that is shorter than the specified exposure.

19. The non-transitory machine-readable medium of claim 18, wherein the convolutional neural network is configured to perform operations in a common encoder path for all of the multiple second image frames and to perform distinct operations in different decoder paths for different ones of the multiple second image frames.

20. The non-transitory machine-readable medium of claim 19, wherein each of the decoder paths comprises at least one decoder stage that includes an upsampling layer, a convolutional layer, and a separable convolutional layer.

* * * * *